March 18, 1958 W. R. GRISWOLD 2,827,548
APPARATUS FOR WELDING
Filed March 6, 1957 2 Sheets-Sheet 1

INVENTOR.
WALTER R. GRISWOLD
BY Andrus & Scales
Attorneys

March 18, 1958 W. R. GRISWOLD 2,827,548
APPARATUS FOR WELDING
Filed March 6, 1957 2 Sheets-Sheet 2
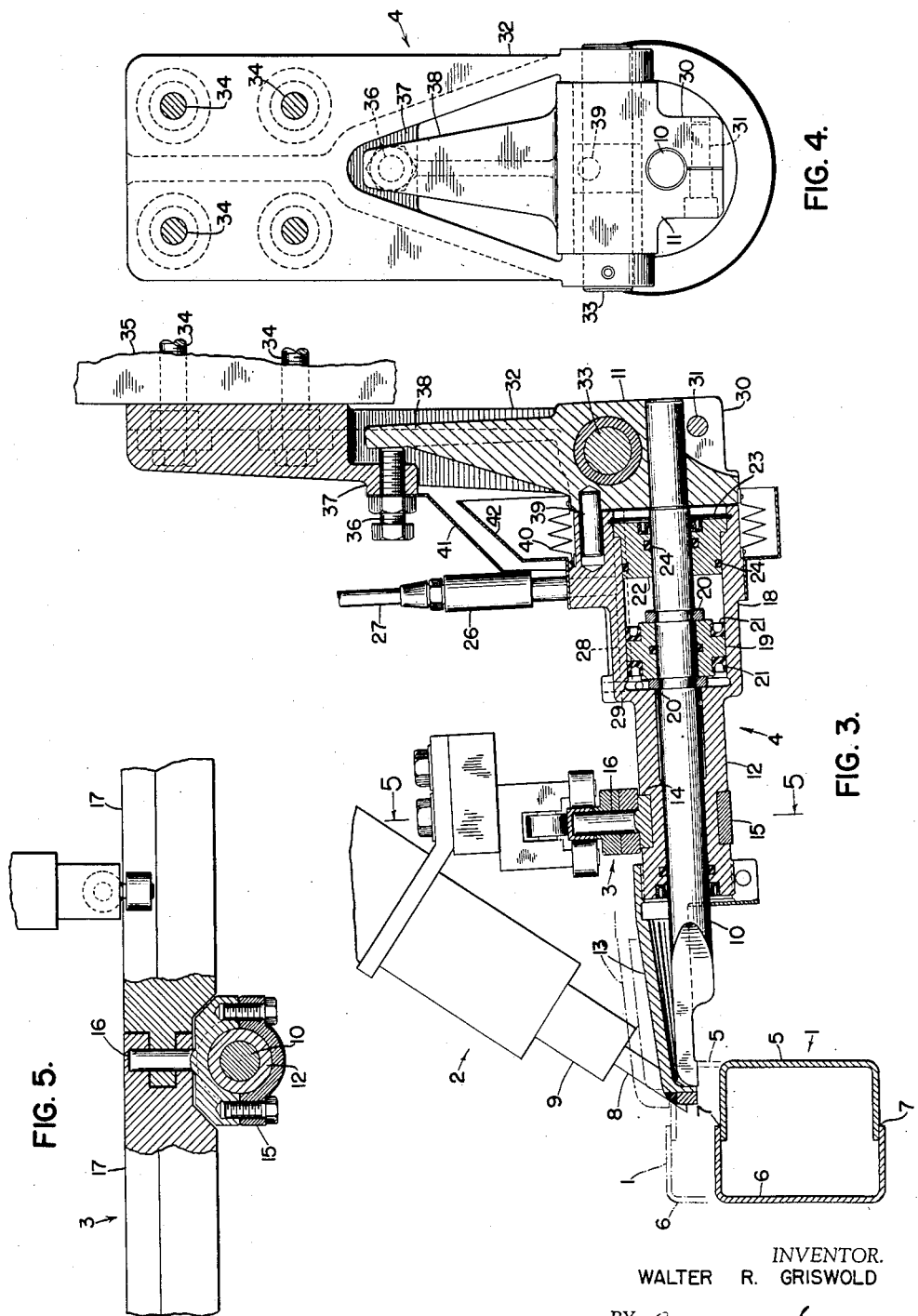
INVENTOR.
WALTER R. GRISWOLD
BY Andrus & Scales
Attorneys United States Patent Office 2,827,548
Patented Mar. 18, 1958

2,827,548

APPARATUS FOR WELDING

Walter R. Griswold, Chicago, Ill., assignor to A. O. Smith Corporation, Milwaukee, Wis., a corporation of New York Application March 6, 1957, Serial No. 644,397

8 Claims. (Cl. 219—125)

This invention relates to an apparatus for welding and more particularly to an apparatus for automatically positioning a welding electrode in welding alignment with a seam to be welded.

The present invention relates to the welding apparatus disclosed in the application of Julius Tiedemann, Serial No. 509,782, filed May 20, 1955, entitled "Method and Apparatus for Welding Vehicle Frames." The apparatus as disclosed in that application is directed to the automatic welding of a longitudinal seam on the side rail of a vehicle frame or other elongated article and comprises, in general, a welding fixture which receives and aligns the frame for welding. A series of welding heads are aligned with each side rail and are adapted to weld a given length of the same on the side rail. Each welding head is connected to an individual drive unit which travels on a rail having a contour corresponding to the longitudinal curvature of the side rail and thereby moves the corresponding welding head along the seam to weld the same.

As each side rail is apt to have bends or other irregularities which depart from the theoretical contour, provision is made for each welding head to follow these irregularities in the seam on the side rail. This is accomplished by a plurality of finger units which carry a flexible track. The finger units engage the seam to be welded and bend the track in conformity with the same, thereby insuring that the track is a given distance from the seam throughout the length of the seam.

Each welding head is adapted to ride on the track and is connected to the corresponding drive unit such that the welding head is permitted to move freely in a lateral direction to the same to follow irregularities in the seam as indicated by the track.

The present invention is directed to an improved construction for the finger units employed to position the welding head in welding alignment with the seam.

According to the invention, each finger unit includes a rod which is fixed with respect to axial movement. A sleeve is slidably disposed on the rod and supports the flexible track on which the welding heads ride. The outer end of the sleeve defines a finger which is adapted to be moved into engagement with the seam to be welded to position the track a given distance from the seam.

To move the finger toward and away from the seam, the inner end of the sleeve is enlarged and defines a cylinder and is slidable on a piston carried by the rod. By introducing hydraulic fluid into either end of the cylinder, the cylinder is moved with respect to the piston to extend or retract the finger.

The present finger construction is a simple and relatively inexpensive structure which acts to positively position the track and welding heads with respect to the seam to be welded.

Other objects and advantages will appear in the course of the following description.

The drawings illustrate the best mode contemplated of carrying out the invention.

In the drawings:

Fig. 3 is a view similar to Fig. 2 showing the position of the finger unit before the side rail of the frame is raised into welding position;

Fig. 4 is an end view of the finger unit shown in Fig. 2; and

Fig. 5 is a view taken along line 5—5 of Fig. 3 and showing the connection of the track segments.

Figure 1:
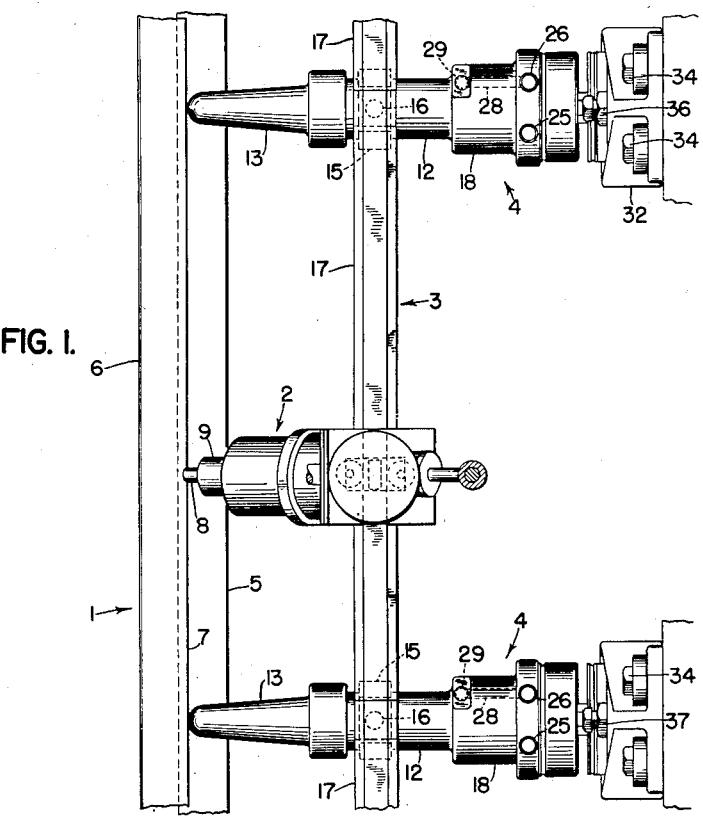
Figure 1 is a top plan view of a portion of the welding apparatus employed to weld the longitudinal seam of the side rail of a vehicle frame.
Figure 2:
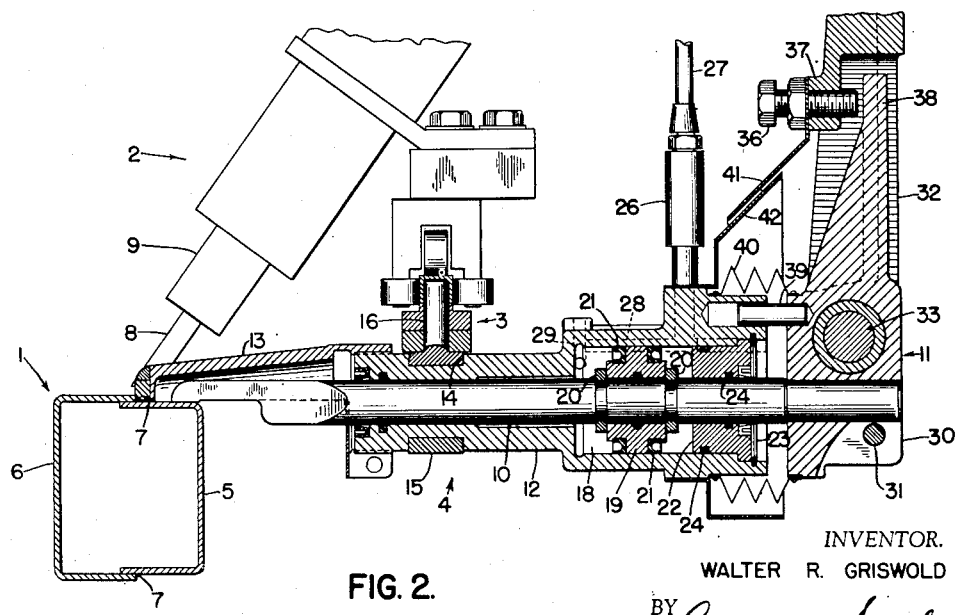
Fig. 2 is a vertical section of a finger unit with the finger disposed in engagement with the seam to be welded.

The drawings illustrate an apparatus for welding the longitudinal seam of a side rail 1 of a vehicle frame or other elongated article and includes a welding head 2 adapted to ride on the flexible track 3 which extends coextensively with the seam to be welded. The welding head 2 is adapted to move along the track to weld the same by a drive unit as described in the application of Julius Tiedemann, Serial No. 509,782, filed May 20, 1955, and the welding head is connected to the drive unit by a welding head guide mechanism which permits the welding head to move relatively to the drive unit to follow vertical and lateral irregularities in the seam which depart from the theoretical contour of the same.

To indicate the lateral irregularities in the seam, a plurality of finger units 4 engage the seam on the upper surface of the side rail 1 and automatically position the welding heads in alignment with the seam. The finger units 4 carry the flexible track 3 and bend the track in conformity with the contour of the seam to be welded. The welding heads 2 ride on the track 3 and are thereby properly positioned with respect to the seam at all times.

The side rail 1 of the vehicle frame has a generally box-shaped cross section and is formed of a channel-shaped inner rail 5 and a channel-shaped outer rail 6 which are disposed with the open sides of the channels facing each other. The outer rail 6 is provided with a larger web portion so that the flanges of the outer rail overlap a portion of the inner rail flanges and provide a lap seam 7 on both the upper and lower surfaces of the side rail. The present invention is adapted to weld spaced lengths of the seam 7 on the side rail 1. Subsequently, in the fabrication or assembly of the vehicle frame, the seams 7 on the lower surface of the side rails are welded by similar apparatus to provide an integral side rail member.

The welding head 2 guides and feeds a consumable electrode 8 toward the seam 7. The consumable electrode 8, which is contained on a reel, not shown, passes through the welding head and emerges from the nozzle 9 of the head adjacent the seam. Electrical energy is supplied to the electrode so that an arc is established between the electrode and the side rail 1. The electrode 8 is fed toward the side rail and consumed at a predetermined rate to provide the desired rate of electrode consumption.

While the drawings illustrate a single welding head, it is contemplated that a series of welding heads would be employed at spaced intervals throughout the length of the article to be welded.

Each of the finger units 4, which carry the track 3, comprises a generally horizontal rod 10 which terminates in a head 11. The rod 10 slidably receives an outer sleeve 12 which supports the flexible track 3, and the outer end of the sleeve 12 defines a finger 13 which is adapted to be moved outwardly into engagement with the seam 7 to be welded.

To support the track, the sleeve 12 is provided with a peripheral recess 14 adjacent the outer end thereof and a collar 15 is secured within the recess. The collar 15 carries an upstanding pin 16. The track 3 is composed of a series of segments 17 which are pivotally interconnected at their adjacent ends by the pin 16 to permit lateral pivotal movement of the segments 17 about the connecting pin. This construction permits the track 3 to be flexed or bent about the pins 16.

The sleeve 12 is moved axially in relation to the fixed rod 10 to bring the finger 13 into contact with the seam 7 by a hydraulic fluid unit. To this end, the inner portion of sleeve 12 is enlarged and defines a cylinder 18 and the inner end of rod 10 carries a piston 19 which is fixed and the cylinder 18 is adapted to slide thereon. The piston 19 is secured on rod 10 by means of retaining rings 20 which are disposed within suitable grooves in the rod 10 on either side of the piston 19. A pair of generally U-shaped packings 21 are secured to the outer surface of piston 19 and provide a fluid seal for the cylinder movement.

The outer end of the cylinder 18 is enclosed by a cap 22 which is locked into place by a spring lock ring 23. Suitable seals 24 are employed to prevent the hydraulic fluid from the cylinder 18 from passing around the cap 22.

Hydraulic fluid under pressure is adapted to be introduced into the ends of the cylinder 18 to move the cylinder and the sleeve 12 with respect to the piston 19. The cylinder 18 is provided with a pair of fluid inlets 25 and 26 which are suitably connected by lines 27 to a source of hydraulic fluid under pressure. The inlet 25 communicates directly with the inner end of the cylinder 18 while the inlet 26 connects with a horizontal passage 28 which in turn communicates with a vertical passage 29 that is in communication with the outer end of the cylinder. With this construction, the cylinder 18 can be moved in relation to the piston 19 by inserting hydraulic fluid into either end of the cylinder through the respective inlets 25 and 26 to move the finger 13 toward and away from seam 7.

In order to insure engagement of finger 13 with seam 7 in the event the seam may be displaced vertically due to irregularities in contour of the side rail, the finger unit is initially disposed at a downwardly inclined angle, as shown in Fig. 3, and the side rail 1, as it is raised upwardly into welding position, engages head 11 and pivots the finger unit to a generally horizontal position.

To provide pivotal movement for the finger unit, the inner end of rod 10 is disposed within an opening in split block 30 and secured therein by lock stud 31. The block 30 is pivotally connected to the depending bifurcated arms of a yoke 32 by pin 33, and the upper end of yoke 32 is secured by studs 34 to a suitably supporting structure 35.

The downward pivotal movement of the finger unit is adjustably controlled by an adjustable stud 36 which is threaded within a suitable opening in the web 37 of yoke 32. The end of the stud 36 is adapted to engage the tongue 38 of block 30. As the finger unit pivots downwardly, the tongue 38 engages the stud 36 and limits the downward pivotal movement. The degree of pivotal movement can be varied by adjustment of the stud 36.

To prevent rotation of the cylinder 18, a lock pin 39 is disposed within suitable aligned openings in the opposed faces of cylinder 18 and the block 30.

To prevent dirt and weld spatter from entering the moving mechanism of the apparatus, a bellows 40 is secured between the end of the cylinder 18 and the block 30. The bellows is adapted to expand and contract as the cylinder 18 moves and serves to enclose the clearance or opening between the adjacent faces of the block 30 and cylinder 18. Further protection is provided by the shields 41 and 42 which enclose the bellows 40 and provide additional protection against weld spatter and foreign matter.

To begin operation, the finger 13 is retracted by introducing hydraulic fluid into the inner end of the cylinder 18 through passage inlet 25. As shown in Fig. 3, the rod 10 and sleeve 12 are inclined downward prior to the side rail 1 being moved upwardly into the welding position. As the side rail 1 is raised, the flange of the outer side rail member 6 engages the head 11 and moves the finger unit 4 to a generally horizontal position. The lower edge of head 11 is spaced a slight distance beneath the lower tip of the finger 13 so that under normal operation, the flange of the side rail 1 will engage only the head and the finger 13 will be spaced a slight distance out of contact with the flange of the outer member.

With the side rail suitably aligned in welding position, the finger 13 is extended by introducing hydraulic fluid into the outer end of cylinder 18 to move the finger outwardly into engagement with the lap seam 7. As the finger itself is not in engagement with the flange of the outer side rail member 6, the finger can move without frictional resistance across the flange and into engagement with the seam 7.

As the track 3 is connected to the sleeve 12, the track is positioned a given distance from the weld seam 7 as the finger units 4 are moved into engagement with the seam 7 and thereby the welding heads 2 carried by the track are positioned in welding alignment with the seam.

The welding heads are then actuated to move the same along the track 3 and weld the seam 7. During the welding operation, the finger 13 is continuously forced against the weld seam by pressure in the hydraulic cylinder so that the track will be maintained in the proper position during the entire welding operation.

As best seen in Fig. 1, finger units 13 are located at the end of the stroke or distance of travel of the weld heads 2 so that the fingers 13 may remain in engagement with the seams 7 during the welding operation and do not have to be retracted. After the welding operation has been completed, an unwelded gap in the seam 7 will exist at the location of the finger units 13. In the normal vehicle frame construction, this gap can remain without affecting the physical properties of the frame. However, if desired, this gap may subsequently be welded in a second welding operation.

Similarly, the seam 7 on the lower surface of the side rail may be welded in a similar manner by turning the frame over and making that weld.

While the above description is directed to the welding of a longitudinal seam on the side rail of a vehicle frame, it is contemplated that the present apparatus may be adapted for use with the welding of any elongated article, either curved or straight, as desired. The present apparatus compensates for minor irregularities in the contour of the seam to be welded which depart from the theoretical or standard contour so that the welding electrode will follow the lateral irregularities in the seam and thereby insure sound uniform welds.

The finger unit apparatus is of simple and inexpensive construction and insures that the finger is in positive engagement with the seam throughout the welding operation. The moving parts of the apparatus are enclosed to prevent weld spatter and other foreign materials from entering the working parts of the apparatus.

Various modes of carrying out the invention are contemplated as being within the scope of the following claims particularly pointing out and distinctly claiming the subject matter which is regarded as the invention.

I claim:

1. An apparatus for positioning a welding electrode in welding alignment with a seam to be welded in a metal article which comprises, a welding head to carry the electrode, a cylinder member, a piston member disposed within said cylinder member, one of said members carrying said welding head and having a finger adapted to engage the seam to be welded and position the electrode a given distance from the seam and the other of said members being fixed with respect to axial movement, and hydraulic means for effecting relative movement between said cylinder member and said piston member to selectively move said finger into engagement with said seam and to retract said finger from the seam.

2. An apparatus for welding a seam in a metal article which comprises, a flexible track composed of a series of track segments, means for pivotally connecting the segments together at adjacent ends to form the track, a series of welding heads supported on the track and adapted to move thereon to weld the seam, a cylinder member disposed to support the track segments at each position of pivotal connection between said segments, a finger associated with the outer end of the cylinder member and adapted to be moved toward the seam to be welded to position the welding head a given distance from the seam, a piston member disposed within the cylinder member and fixed with respect to axial movement, and means for introducing hydraulic fluid into the cylinder to move the cylinder with respect to the piston member and thereby move said finger toward and away from the seam to be welded.

3. An apparatus for positioning a welding head in welding alignment with a seam to be welded in a metal article which comprises, a series of track segments, a pin member pivotally connecting the adjacent ends of the track segments together to provide a track capable of being flexed in a lateral direction, a series of welding heads disposed on the track and adapted to ride thereon to weld the length of the seam, each of said welding heads having a length of travel between adjacent pivotal connections, a cylinder member supporting the pin member and having an outer end defining a finger adapted to be moved into engagement with the seam to be welded to correspondingly position the welding head a given distance from the seam, a piston member disposed within the cylinder member and fixed with respect to axial movement, and means for introducing hydraulic fluid into the cylinder member to move said cylinder member with respect to the piston member to correspondingly move said finger into engagement with the seam and to retract the same from the seam.

4. An apparatus for positioning a welding electrode in welding alignment with a lap seam to be welded in a metal article which comprises, a welding head to carry the electrode, a flexible track to support the welding head, a cylinder member secured to the track to support the same, a finger associated with the outer end of the cylinder member and adapted to be moved into contact with the seam to position the welding head and electrode a given distance from the seam, a piston member disposed within the cylinder member and fixed with respect to axial movement, a head associated with the outer end of the piston member with the lower portion of the head extending a slight distance below the lower portion of the finger, said head adapted to initially engage the article and to space the finger out of engagement with the surface of the article, and means for introducing hydraulic fluid into the cylinder member to move the cylinder member with respect to the piston member and thereby move the finger into engagement with the lap seam.

5. An apparatus for positioning a welding electrode in welding alignment with a lap seam to be welded in a metal article which comprises, a welding head to carry the electrode, a track to support the welding head, a cylinder member secured to the track to support the same and having a finger associated with the outer end thereof, said finger adapted to be moved axially of the cylinder member to engage the lap seam to be welded and correspondingly position the electrode a given distance from the seam, a piston member disposed within the cylinder member and fixed with respect to axial movement, means for spacing the finger out of engagement with the surface of the article when the article is in welding position, and means for introducing hydraulic fluid into the cylinder member to move said cylinder member with respect to the piston member to thereby move the finger into engagement with the lap seam to be welded.

6. An apparatus for positioning a welding electrode in welding alignment with a seam to be welded in a metal article which comprises, a welding head to carry the electrode, a flexible track to support the welding head, a cylinder secured to the track to support the same, a finger associated with the outer end of the cylinder and adapted to engage the seam to be welded to thereby position the electrode a given distance from the seam, a piston member disposed within the cylinder and fixed with respect to axial movement, means for introducing hydraulic fluid into the cylinder to move the cylinder with respect to said piston member and thereby move the finger toward and away from the seam to be welded, means for pivotally supporting the piston member, and means for limiting the downward pivotal movement of the piston member to freely position the piston member at an inclined downward angle and to permit the piston member to be moved upwardly to a generally horizontal position as the article is raised into welding position and contacts said piston member.

7. An apparatus for positioning a welding electrode in welding alignment with a lap seam to be welded in a metal article which comprises, a welding head to carry the electrode, a flexible track to support the welding head, a cylinder member secured to the track to support the same, a finger associated with the outer end of the cylinder member and adapted to be moved into contact with the seam to position the welding head and electrode a given distance from the seam, a rod disposed within the cylinder member and projecting outwardly of the ends of said cylinder member, a piston carried by said rod and disposed within said cylinder member, and means associated with the inner end of said rod and disposed outwardly of the cylinder member for supporting said rod for limited pivotal movement in a given plane.

8. An apparatus for positioning a welding electrode in welding alignment with a lap seam to be welded in a metal article which comprises, a welding head to carry the electrode, a flexible track to support the welding head, a cylinder member secured to the track to support the same, a finger associated with the outer end of the cylinder member and adapted to be moved into contact with the seam to position the welding head and electrode a given distance from the seam, a rod disposed within the cylinder member and projecting outwardly of the ends of said cylinder member, a piston carried by said rod and disposed within said cylinder member, and shield means covering a projecting end portion of said rod for preventing weld spatter and foreign material from contacting said rod.

No references cited.